United States Patent
Mueller

(10) Patent No.: US 10,330,220 B2
(45) Date of Patent: Jun. 25, 2019

(54) EDGE PROTECTION BUSHING WITH INTEGRATED CLAMP

(71) Applicant: Novelis Inc., Atlanta, GA (US)

(72) Inventor: Christian Mueller, Olpe (DE)

(73) Assignee: NOVELIS INC., Atlanta, GA (US)

( * ) Notice: Subject to any disclaimer, the term of this patent is extended or adjusted under 35 U.S.C. 154(b) by 89 days.

(21) Appl. No.: 15/116,342

(22) PCT Filed: Mar. 30, 2015

(86) PCT No.: PCT/US2015/023266
§ 371 (c)(1),
(2) Date: Aug. 3, 2016

(87) PCT Pub. No.: WO2015/153416
PCT Pub. Date: Oct. 8, 2015

(65) Prior Publication Data
US 2017/0009913 A1   Jan. 12, 2017

Related U.S. Application Data

(60) Provisional application No. 61/972,791, filed on Mar. 31, 2014.

(51) Int. Cl.
*F16L 7/00* (2006.01)
*H02G 3/06* (2006.01)
*F01N 13/00* (2010.01)

(52) U.S. Cl.
CPC ............. *F16L 7/00* (2013.01); *F01N 13/008* (2013.01); *H02G 3/06* (2013.01); *H02G 3/065* (2013.01);
(Continued)

(58) Field of Classification Search
CPC .. F16L 7/00; H02G 3/06; H02G 3/065; F01N 13/008; F01N 2560/025; H01R 13/5829
(Continued)

(56) References Cited

U.S. PATENT DOCUMENTS 3,041,088 A * 6/1962 Brandon, Jr. ....... F16B 37/0885
285/33
3,711,632 A * 1/1973 Ghirardi .................. H02G 3/06
174/135
(Continued)

FOREIGN PATENT DOCUMENTS

CN   103026567 A   4/2013
DE   8516541       8/1985
(Continued)

OTHER PUBLICATIONS

"Data Sheet 02/12-308-6: TALEXcontrol LED C004 PWM booster," XP055196036, Feb. 1, 2012, 3 pages, TRIDONIC.
(Continued)

*Primary Examiner* — Timothy J Thompson
*Assistant Examiner* — Rhadames Alonzo Miller
(74) *Attorney, Agent, or Firm* — Kilpatrick Townsend & Stockton LLP

(57) ABSTRACT

An edge protection bushing 106 with integrated clamp 208 is disclosed. The bushing 106 includes a tail end 202 for attachment to a heat protection tube and a head end 206 for accepting a cable protection hose. A clamp 208 is positioned adjacent the head end 206 and held in place by one or more breakable tabs 214 designed to break when pressure is applied to push the clamp 208 towards the head end 206. As the clamp 208 is pressed towards the head end 206, a locking mechanism 210, 212 secures the clamp 208 in place to secure the cable protection hose between the clamp 208 and the head end 206.

26 Claims, 15 Drawing Sheets

(52) U.S. Cl.
CPC .... *F01N 2260/20* (2013.01); *F01N 2560/025* (2013.01)

(58) Field of Classification Search
USPC ........................................................ 174/655
See application file for complete search history.

(56) References Cited

U.S. PATENT DOCUMENTS

| | | | | |
|---|---|---|---|---|
| 4,169,572 A * | 10/1979 | Simon | .................. | H02G 3/0658 16/2.5 |
| 4,180,227 A * | 12/1979 | Gretz | ..................... | H01B 17/58 174/135 |
| 4,248,459 A * | 2/1981 | Pate | ...................... | F16L 3/1236 174/665 |
| 4,443,031 A * | 4/1984 | Borsh | ................. | F16L 25/0045 285/419 |
| 4,568,047 A | 2/1986 | Matsui | | |
| 4,795,197 A * | 1/1989 | Kaminski | ........... | F16L 25/0045 285/12 |
| 4,801,158 A * | 1/1989 | Gomi | .................. | F16L 25/0036 285/330 |
| 4,829,145 A * | 5/1989 | Mitchell | .................. | H02G 3/06 174/480 |
| 4,888,453 A * | 12/1989 | Blasko | ................. | H02G 3/0691 174/135 |
| 5,015,013 A * | 5/1991 | Nadin | ................. | F16L 25/0045 285/419 |
| 5,277,459 A * | 1/1994 | Braun | ..................... | H02G 3/06 174/92 |
| 5,907,653 A * | 5/1999 | Burek | ................. | G02B 6/3801 385/135 |
| 5,984,375 A * | 11/1999 | Merrett | ............... | F16L 25/0036 285/253 |
| 6,302,446 B1 * | 10/2001 | Spears | ................ | F16L 19/0231 285/33 |
| 6,464,263 B1 * | 10/2002 | Schwarz | ............. | F16L 25/0045 285/305 |
| 6,811,191 B2 * | 11/2004 | Mills | ................... | F16L 25/0045 285/409 |
| 7,350,834 B2 * | 4/2008 | Ryhman | .................. | F16L 23/04 285/406 |
| 7,388,149 B2 * | 6/2008 | Doherty | .............. | F16L 25/0045 174/21 JS |
| 8,042,839 B2 * | 10/2011 | Rammhofer | ........ | F16L 23/0283 285/215 |
| 8,650,706 B2 * | 2/2014 | Shibata | ................. | A47L 7/0085 15/323 |
| 8,746,746 B1 * | 6/2014 | Schafer | ................ | F16L 41/021 285/133.11 |
| 8,901,441 B2 * | 12/2014 | Sathyanarayana | ... | H02G 3/0691 174/655 |
| 8,967,676 B1 * | 3/2015 | Dick | ....................... | F16L 21/06 285/419 |
| 2002/0066835 A1 * | 6/2002 | Sentpali | .................... | F16B 2/12 248/68.1 |
| 2002/0100606 A1 * | 8/2002 | Rule | ........................ | H02G 3/22 174/151 |
| 2006/0005988 A1 * | 1/2006 | Jorgensen | .............. | H02G 3/083 174/655 |
| 2006/0013282 A1 * | 1/2006 | Hanzawa | ................. | G01K 1/08 374/163 |
| 2007/0138789 A1 * | 6/2007 | Muenzenberger | ......................... | B23B 51/0426 285/189 |
| 2007/0162008 A1 * | 7/2007 | Cline, Jr. | ........... | A61B 17/7037 606/60 |
| 2015/0128681 A1 * | 5/2015 | Stier | .................. | G01N 27/4078 73/23.31 |

FOREIGN PATENT DOCUMENTS

| | | | | |
|---|---|---|---|---|
| EP | 1845597 A1 * | 10/2007 | .......... | H02G 3/0658 |
| EP | 2618436 A2 | 7/2013 | | |
| GB | 2183405 A | 6/1987 | | |
| JP | S60052683 U | 4/1985 | | |
| JP | S61000579 U | 1/1986 | | |

OTHER PUBLICATIONS

International Patent Application No. PCT/US2015/023266, International Search Report and Written Opinion dated Jun. 29, 2015, 14 pages.
International Patent Application No. PCT/US2015/023266, International Preliminary Report on Patentability dated Oct. 13, 2016, 9 pages.
Canadian Patent Application No. 2,943,352, Office Action dated May 31, 2017, 3 pages.
Chinese Patent Application No. 201580017675.X, Office Action dated Jun. 27, 2017, 19 pages.
Japanese Patent Application No. 2016-559235, Office Action dated Jan. 16, 2018, 5 pages.
Korean Patent Application No. 10-2016-7023298, Office Action dated Feb. 13, 2018, 11 pages.
Chinese Patent Application No. 201580017675.X, Office Action dated Feb. 24, 2018, 12 pages.
Canadian Patent Application No. 2,943,352, Office Action dated Apr. 16, 2018, 3 pages.
European Application No. 15718028.2 , Communication Pursuant to Article 94(3) EPC, Aug. 2, 2018, 4 pages.

* cited by examiner

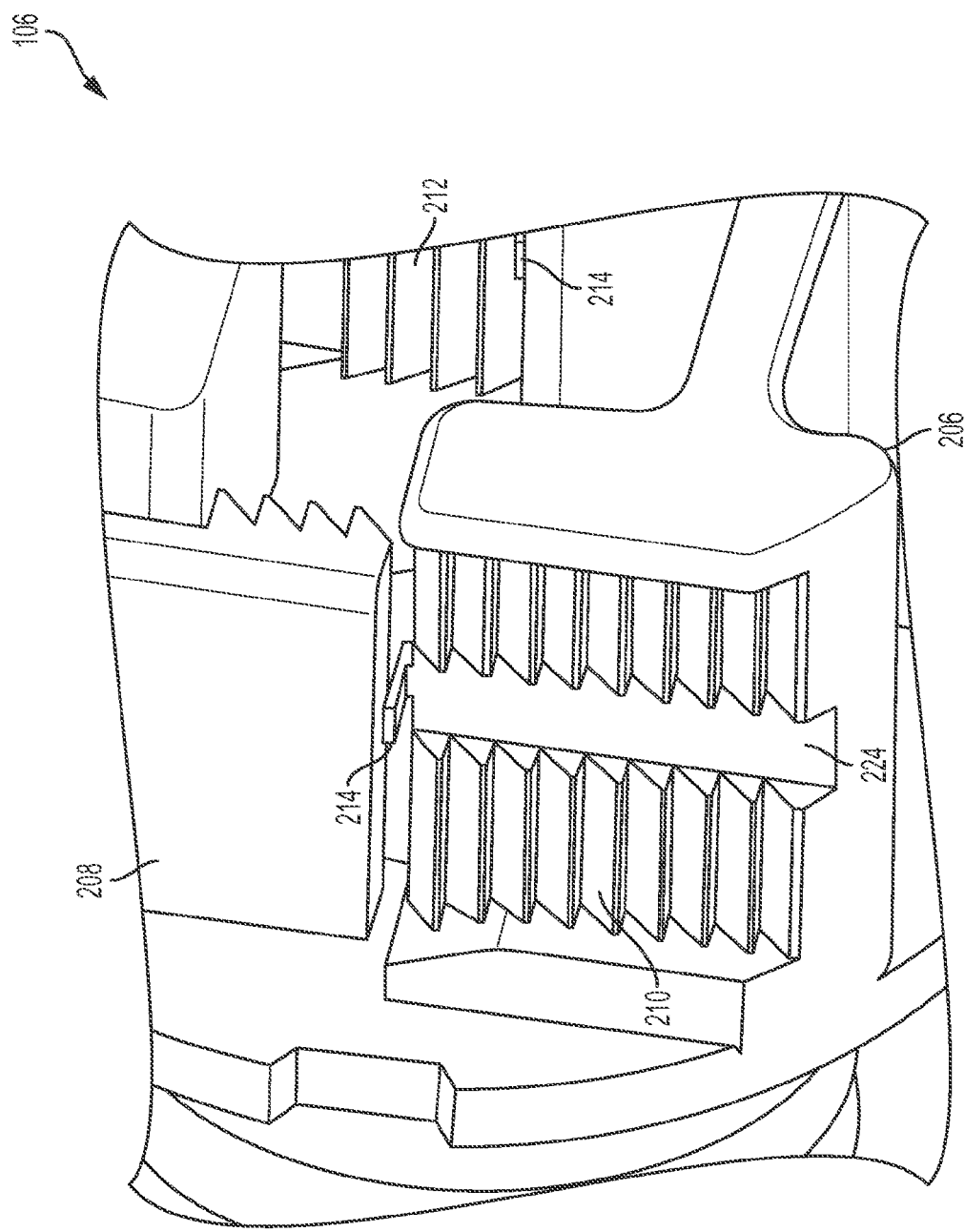

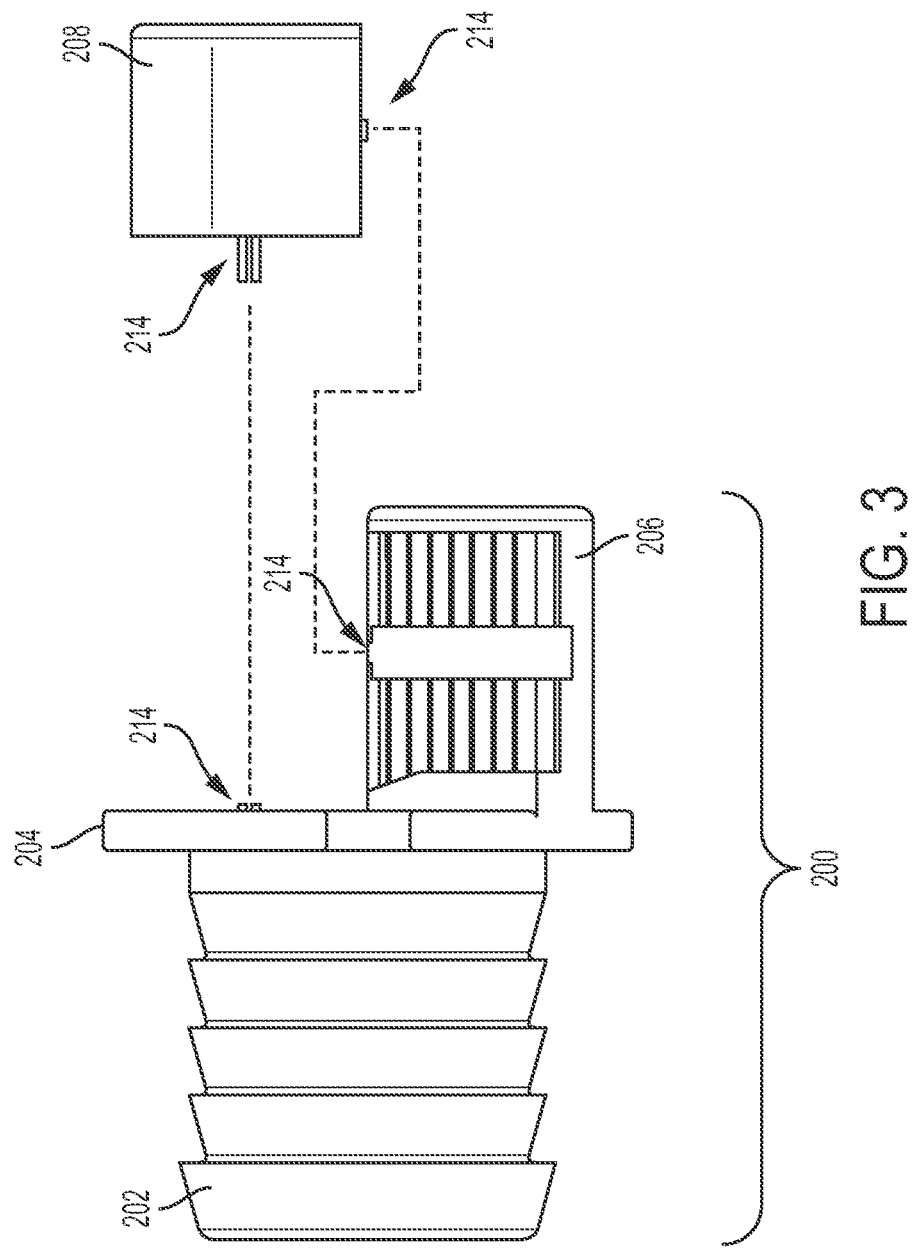

EDGE PROTECTION BUSHING WITH INTEGRATED CLAMP

CROSS-REFERENCE TO RELATED APPLICATIONS

This application is a national stage application under 35 U.S.C. § 371 of International Application No. PCT/US2015/023266, filed Mar. 30, 2015, which claims the benefit of U.S. Provisional Patent Application No. 61/972,791 filed on Mar. 31, 2014 for an "Edge Protection Bushing with Integrated Clamp," the disclosures of which are hereby incorporated by reference in their entireties.

TECHNICAL FIELD

The present disclosure relates to fasteners generally and more specifically to edge protection bushings.

BACKGROUND

Edge protection bushings can be used to couple two bodies together while allowing electrical conductors to pass through the coupling. The bushing can protect the electrical conductors from edges of the two bodies. In one example, an edge protection bushing can be used to protect individually insulated electrical conductors at a junction between a heat protection tube and a cable protection hose of a lambda sensor in an automobile. The heat protection tube can be aluminum and can have sharp edges. In order to connect the heat protection tube to the cable protection hose, a bushing is used. In current practice, an aluminum bushing can be crimped to the heat protection tube and placed around the cable protection hose where it is secured to the hose with a plastic tie. The use of plastic ties requires significant manipulation and extra parts.

It can be desirable to have a bushing that simplifies the installation process and requires fewer individual parts.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

An edge protection bushing with integrated clamp is disclosed. The edge protection bushing may be used in the automotive industry or in any suitable application. In some embodiments, the disclosed bushing can be used to fix heat protection tubes onto various protected parts such as, but not limited to, coolant fluid lines, vacuum hoses, working cables, wiring, and other suitable parts. The bushing is used to couple and secure a heat protection tube, which protects the protected parts against radiation heat and other elements, to the protected parts, such as wiring.

In one embodiment, the bushing includes a tail end for attachment to a first object, such as a heat protection tube, and a head end for accepting and securing a second object, such as a cable protection hose. A clamp is positioned adjacent the head end and may include one or more breakable tabs. In one embodiment, the clamp and the head end include at least one locking mechanism that secures the clamp into a fixed position to secure, for example, a cable protection hose or other object. The clamp and the head end can include respective clamping recesses that can be engaged by a clamping tool or by hand to apply pressure to push the clamp towards the head end, breaking the breakable tabs, and engaging the locking mechanism, thus securing any object, such as a cable protection hose between the clamp and the head end.

The disclosed edge protection bushing with integrated clamp combines features of an edge protection bushing and a clamping mechanism (e.g., a zip tie) in a single part. Additionally, use of the edge protection bushing with integrated clamp, as disclosed herein, can reduce assembly times and difficulty of assembly.

In some embodiments, the bushing can be pre-installed at the tail end, such as being pre-installed on a heat protection tube or other object. In order to assemble, for example, a lambda sensor assembly, one need only pass conductors through the bushing, insert the cable protection hose, and press down on the clamp of the bushing to secure the cable protection hose in place.

Additionally, the ratcheting design of the locking mechanism, as described in further detail below, allows the edge protection bushing with integrated clamp to attach to various different cables of varying diameter (e.g., gauge) and having varying numbers of internal conductors.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

BRIEF DESCRIPTION OF THE DRAWINGS

The specification makes reference to the following appended figures, in which use of like reference numerals in different figures is intended to illustrate like or analogous components.

FIG. 2B is a close-up partial projection of the locking mechanism of the bushing of FIG. 2A.

FIG. 3 is an exploded view of a bushing with a clamp that has been broken off according to one embodiment.

DETAILED DESCRIPTION

Figure 1:
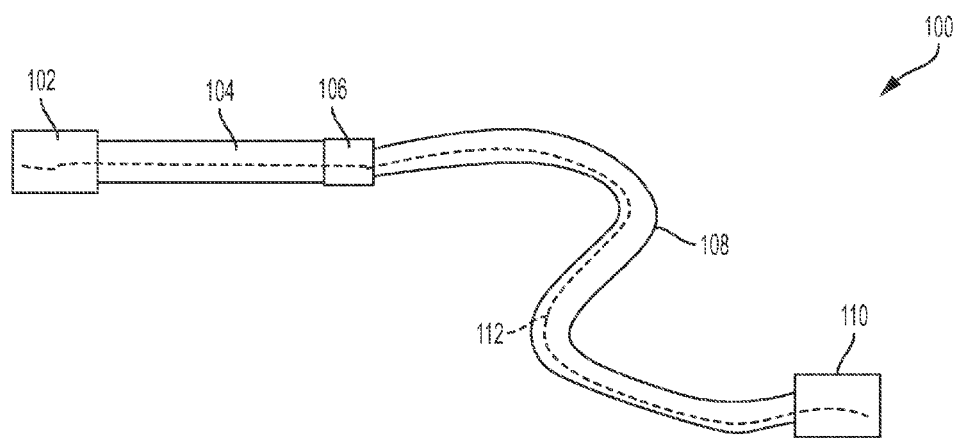
FIG. 1 is a schematic depiction of a lambda sensor assembly according to one embodiment.

FIG. 1 is a schematic depiction of a lambda sensor assembly 100 according to one embodiment. The lambda sensor assembly 100 includes a lambda sensor 102, a heat protection tube 104, a bushing 106, a cable protection hose 108, and a connector 110. One or more conductors 112 can be disposed within the heat protection tube 104 and cable protection hose 108. The conductors 112 connect the lambda sensor 102 to the connector 110 and any electronics to which the connector 110 is attached. While the lambda sensor assembly 100 is one particular use of the disclosed bushings, the bushing embodiments disclosed herein can be used with other assemblies.

Figure 2A:
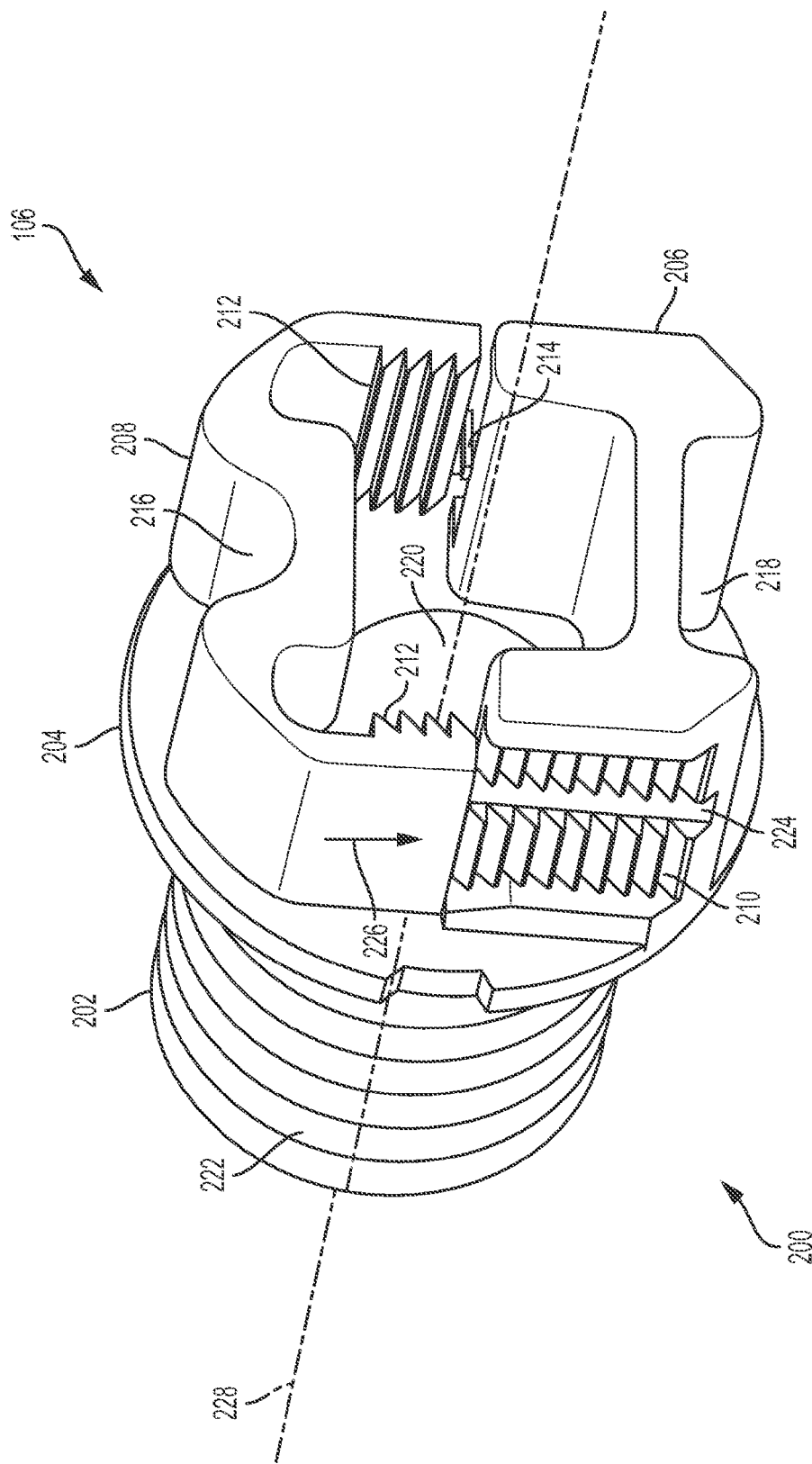
FIG. 2A is an axonometric projection of a bushing according to one embodiment and shown in the unclamped position.

FIG. 2A is an axonometric projection of a bushing 106 according to one embodiment. The bushing 106 may be made of plastic or any other suitable material. The bushing 106 includes a main body 200 having a tail end 202 and a head end 206. In one embodiment, the tail end 202 has a number of ridges 222 or threads to provide additional grip when the tail end 202 is placed within another object and/or when an object is crimped onto the tail end 202. In some embodiments, the tail end 202 is cone-shaped and includes ridges 222 of differing diameter to better grip an object such as a heat protection tube 104. In some embodiments, the ridges 222 are sawtooth shaped to allow an object such as a heat protection tube 104 to be placed onto the tail end 202, but resist removal of the object from the tail end 202. The tail end 202 is sized to accept a heat protection tube 104, for example a tube that is approximately 4 millimeters in diameter, although a tube of any suitable dimension can be used. In alternate embodiments, the tail end 202 has other features capable of engaging an object other than ridges 222, some of which are described in further detail below. As one example, the tail end 202 may include threads that engage with corresponding threads of the object.

A flange 204 is located between the tail end 202 and the head end 206. The flange 204 can help prevent the heat protection tube 104 from touching anything past the flange 204, such as the cable protection hose 108. An opening 220 is located through the main body 200 to allow objects, such as individually insulated electrical conductors, to pass through the bushing.

Adjacent the head end 206 is a clamp 208. The clamp 208 has two sets of teeth 212. The head end 206 has two sets of teeth 210. Each of the sets of teeth 212 are positioned to interlock with the respective set of teeth 210. The teeth 212 and the teeth 210 can have any suitable cross section, such as a sawtooth shape, and can have graduations of approximately 0.8 millimeters, although any suitable size graduations may be used. As described in more detail below, each set of teeth 212 engages with the respective set of teeth 210 to lock the clamp 208 in a clamped position.

One or more breakable tabs 214 may be used to secure the clamp 208 in an initial, unclamped position shown in FIGS. 2-4, 7, and 10-11, where the teeth 212 and the teeth 210 are not engaged with one another. In some embodiments, one or more breakable tabs 214 are positioned between a set of teeth 212 and a set of teeth 210.

As shown in FIG. 2A, the clamp 208 includes a first clamping recess 216 and a second clamping recess 218. In use, a clamping tool, as described in further detail below, engages the first clamping recess 216 and the second clamping recess 218 to break the breakable tabs 214, thus allowing the clamp 208 to move so that the teeth 210 engage with the teeth 212 to secure the clamp in a clamped position.

When the breakable tabs 214 are broken, they can be configured to remain attached to the clamp 208. The breakable tabs 214 can then fall within grooves 224 located in either the head end 206 or main body 200. As shown in FIGS. 2-3, grooves 224 can be located adjacent each set of teeth 210, or more specifically, grooves 224 can be positioned within each set of teeth 210. If so configured, the breakable tabs 214 can help guide the clamp 208 in a lateral direction 226, thus keeping the clamp 208 from moving axially along the main body axis 228.

When a suitable force is applied to clamp 208 to break the breakable tabs 214 and move the clamp 208 in a lateral direction 226, each set of teeth 212 engages a respective set of teeth 210 to secure the clamp 208 into the clamped position (shown in FIG. 13). In other embodiments, other suitable locking mechanisms can be used. Because of the bendable nature of the main body 200 and clamp 208, the first set of teeth 212 ratchet along the second set of teeth 210.

In use, a tube, hose, or other object is placed between the clamp 208 and head end 206 while the clamp 208 is in the unclamped position. The clamp is the moved in the lateral direction 226 into its clamped position (by a clamping tool as discussed below or otherwise) so that the clamp 208 clamps down upon the tube, hose, or other object and locks in place due to the locking nature of the teeth 212 engaging the teeth 210.

In some embodiments, all inner walls of the head end 206 and clamp 208 can be rounded to prevent chafing and wear of any object clamped between the head end 206 and the clamp 208, such as a cable protection hose 108.

FIG. 2B is a close-up partial projection of the locking mechanism of the bushing 106 of FIG. 2A according to one embodiment. The breakable tabs 214 are shown positioned between a set of teeth 212 and a set of teeth 210 to prevent lateral movement of the clamp. In some embodiments, a groove 224 is located within each of the sets of teeth 210 as illustrated.

FIG. 3 is an exploded view of a bushing 106 with a clamp 208 that has been broken off according to one embodiment. The bushing 106 includes a main body 200 that is comprised of a tail end 202, a flange 204, and a head end 206. The bushing 106 further includes a clamp 208 that is attached to the main body 200 by breakable tabs 214.

Figure 4:
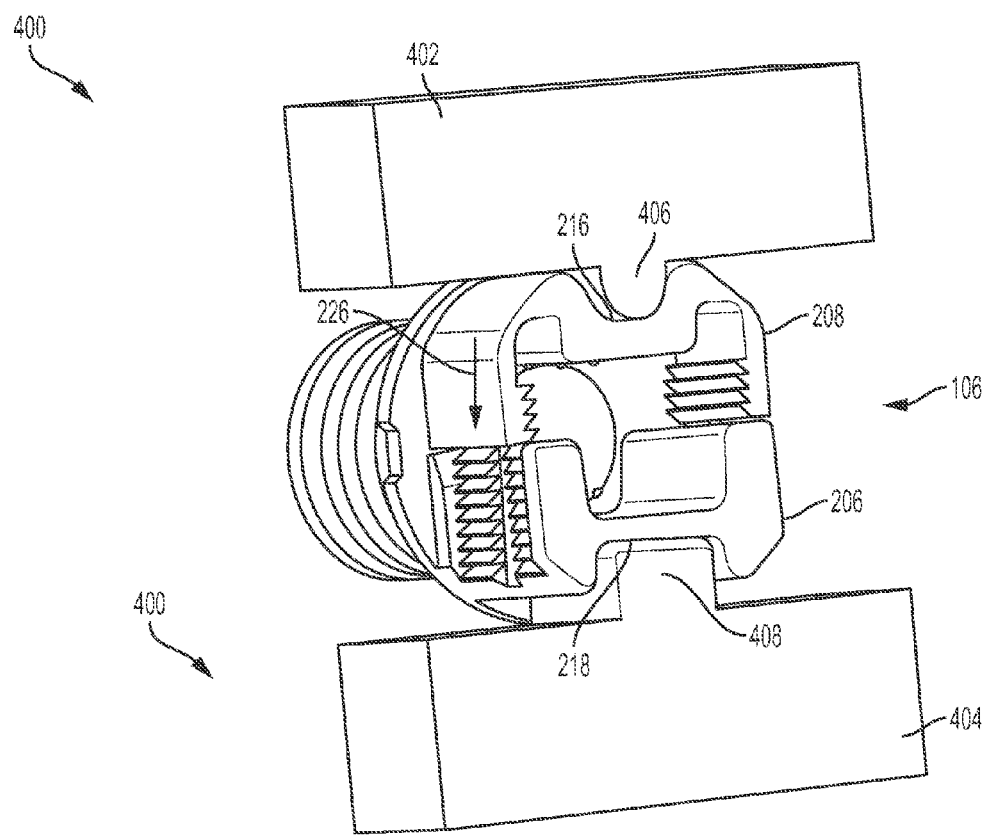
FIG. 4 is an axonometric projection of a clamping tool used with the bushing of FIG. 2A.

FIG. 4 is an axonometric projection of a clamping tool 400 used to move the clamp 208 from its initial unclamped position into its clamped position. Clamping tool 400 can be used to compress the clamp 208 in the lateral direction 226 towards the head end 206 in order to clamp a tube, hose, or other object positioned between the clamp 208 and the head end 206.

The clamping tool 400 includes a top block 402 and a bottom block 404 that are pressed toward one another. The top block 402 and bottom block 404 can be pressed together by any suitable method, including lever action from a scissor-like handheld clamping tool 400. In alternate embodiments, the top block 402 and bottom block 404 can be pressed together by one or more automated devices, such as a hydraulic ram.

The top block 402 can include a top interlocking feature 406 that engages the first clamping recess 216. The bottom block 404 can include a bottom interlocking feature 408 that engages the second clamping recess 218.

Compression forces from one or both of the top block 402 and the bottom block 404 cause the breakable tabs 214 to break and enable the clamp 208 to move in a lateral direction 226 into the clamped position as described above. In some embodiments, the clamp 208 can be engaged by hand without an external device such as clamping tool 400.

Figure 5:
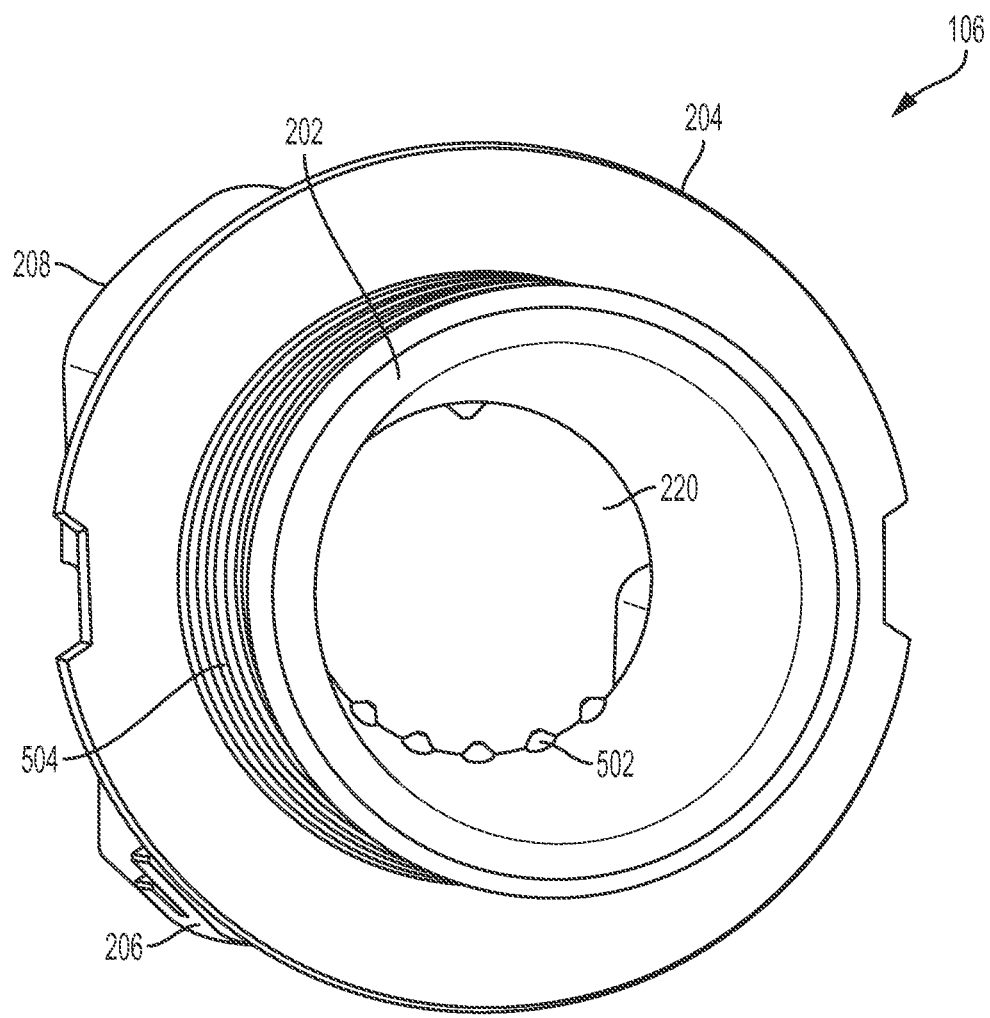
FIG. 5 is a generally rearward facing axonometric projection of a bushing according to one embodiment.

FIG. 5 is a generally rearward facing axonometric projection of a bushing 106 according to one embodiment. The bushing 106 is seen from the rear, showing the tail end 202 and the opening 220. In some alternate embodiments, the tail end 202 can have threading 504 that can be used to engage (e.g., screw into) an object, such as a heat protection tube 104.

In some embodiments, the opening 220 can include gripping features 502. The gripping features 502 can help retain an object, such as a cable protection hose 108 within the bushing 106. The gripping features 502 can be small cones or any other suitable feature that prevents movement of the cable protection hose during axial loading.

Figure 6:
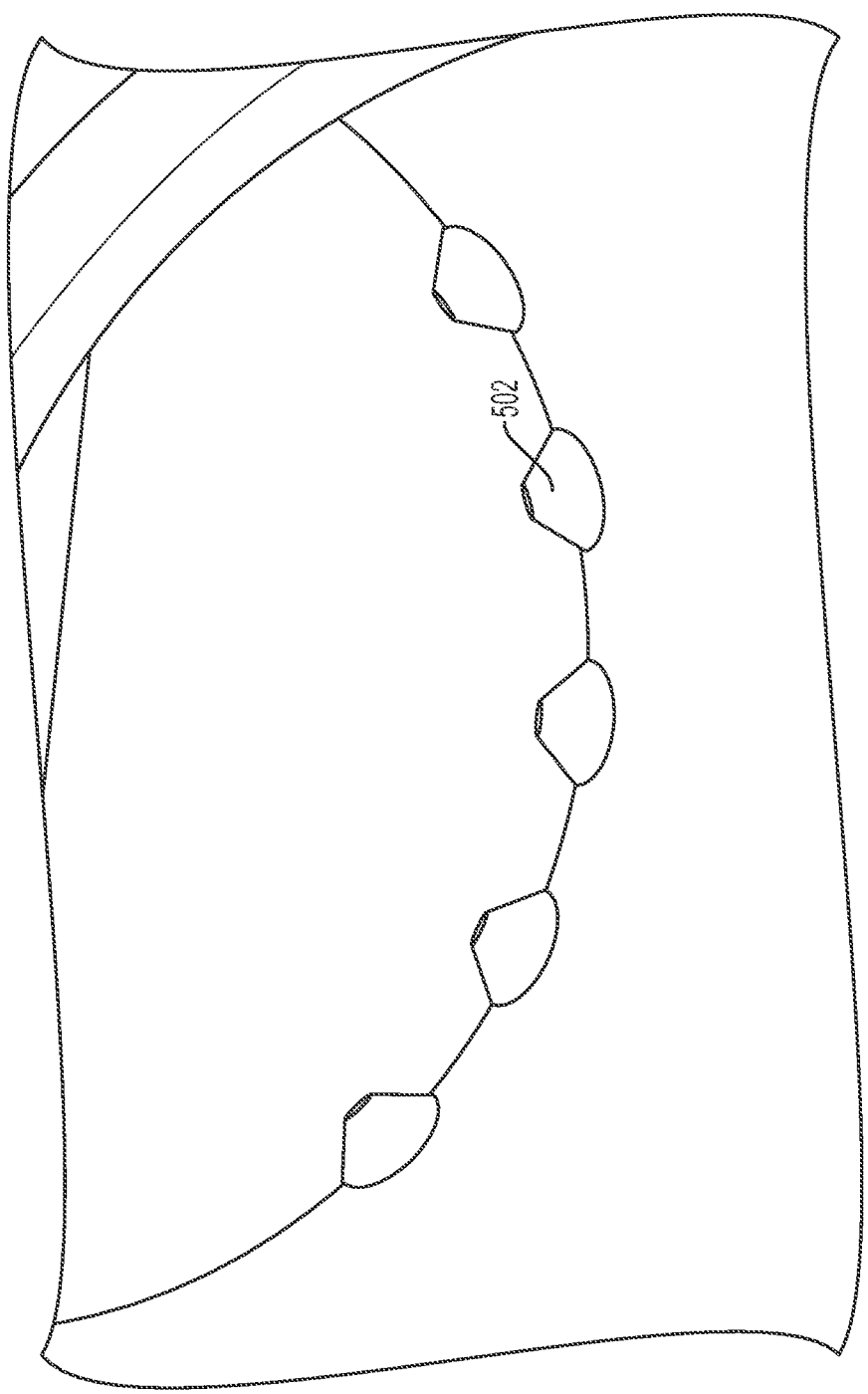
FIG. 6 is a close-up view of the gripping features of the bushing of FIG. 5.

FIG. 6 is a close-up view of the gripping features 502 of the bushing 106 of FIG. 5 according to one embodiment.

Figure 7:
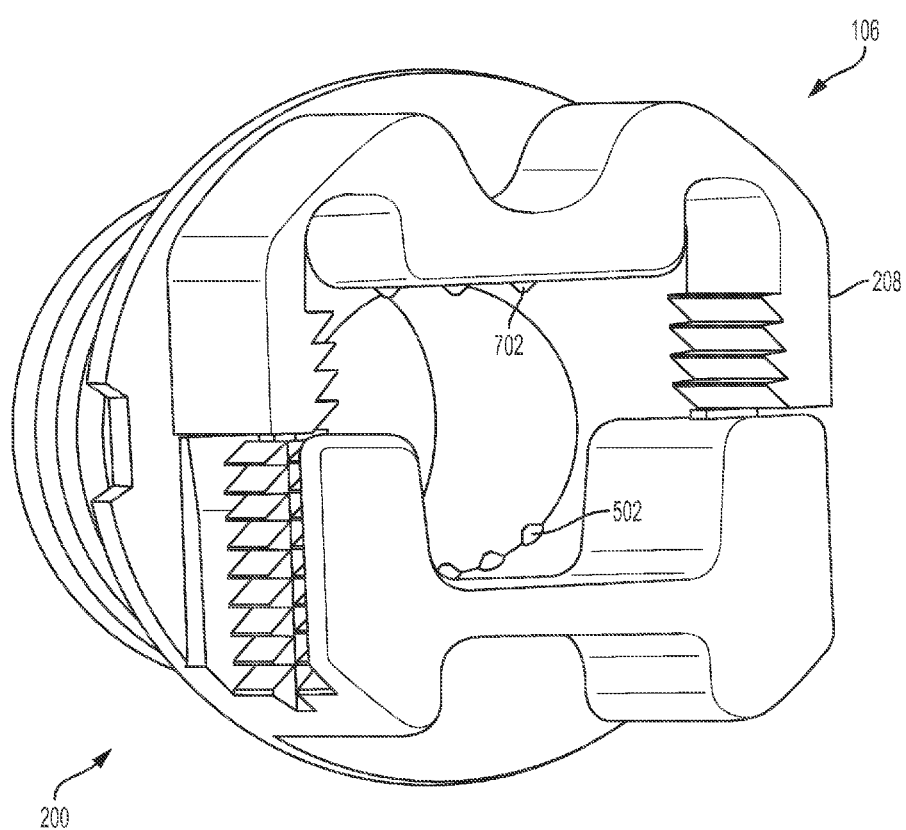
FIG. 7 is an axonometric projection of a bushing shown in the unclamped position according to one embodiment.

FIG. 7 is an axonometric projection of a bushing 106 according to one embodiment. The clamp 208 can include clamp gripping features 702 that generally oppose gripping features 502 of the main body 200. When the clamp 208 is pressed against an object such as a cable protection hose 108, the clamp gripping features 702 and the gripping features 502 of the main body 200 together provide additional grip.

Figure 8:
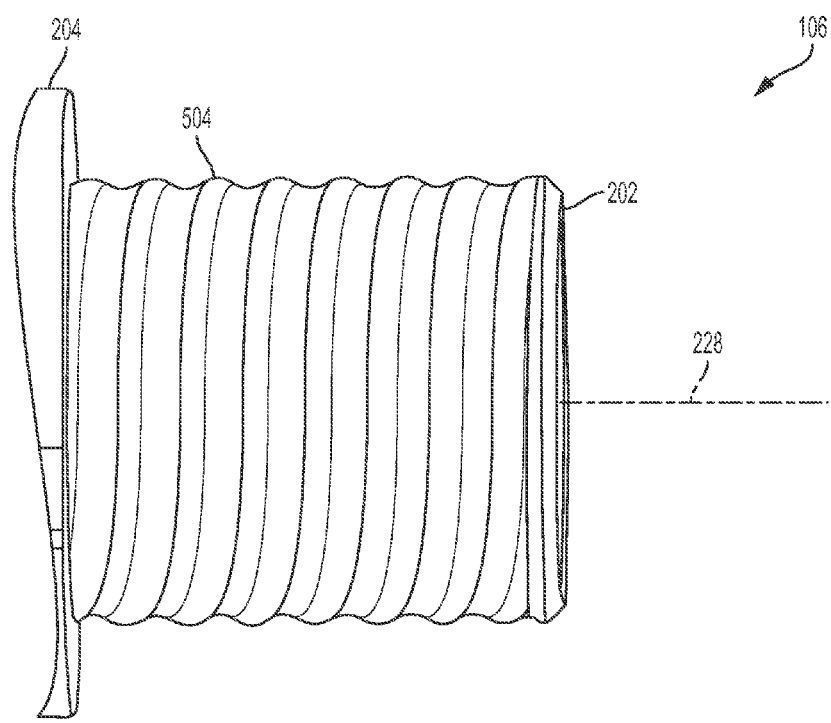
FIG. 8 is a partial side view of the bushing of FIG. 5.

FIG. 8 is a partial side view of the bushing 106 of FIG. 5 according to one embodiment.

Figure 9:
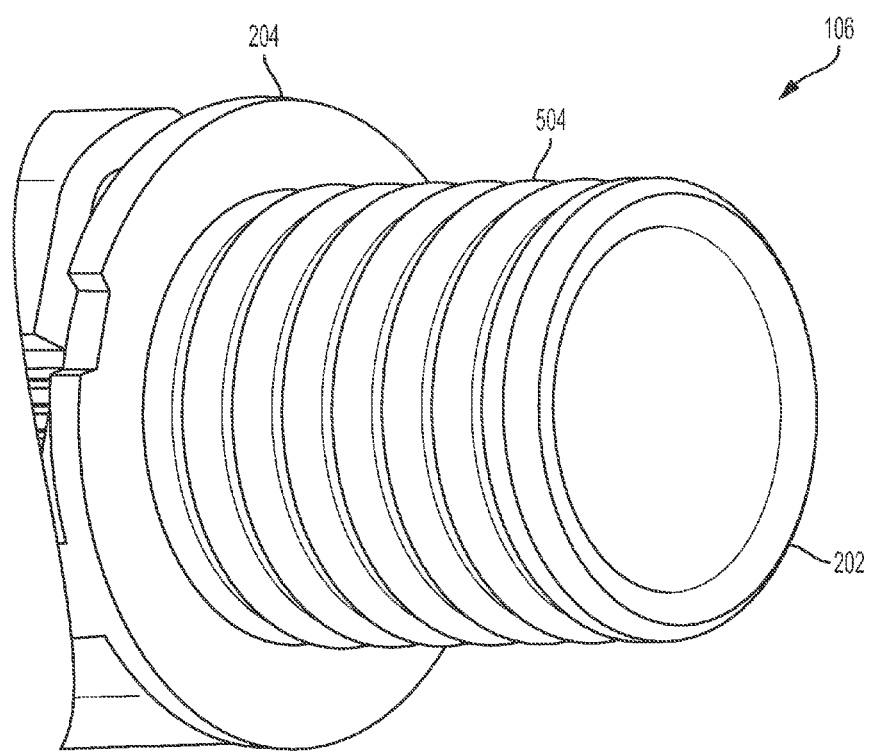
FIG. 9 is an axonometric projection of the bushing of FIG. 5.

FIG. 9 is an axonometric projection of the bushing 106 of FIG. 5 according to one embodiment.

Figure 10:
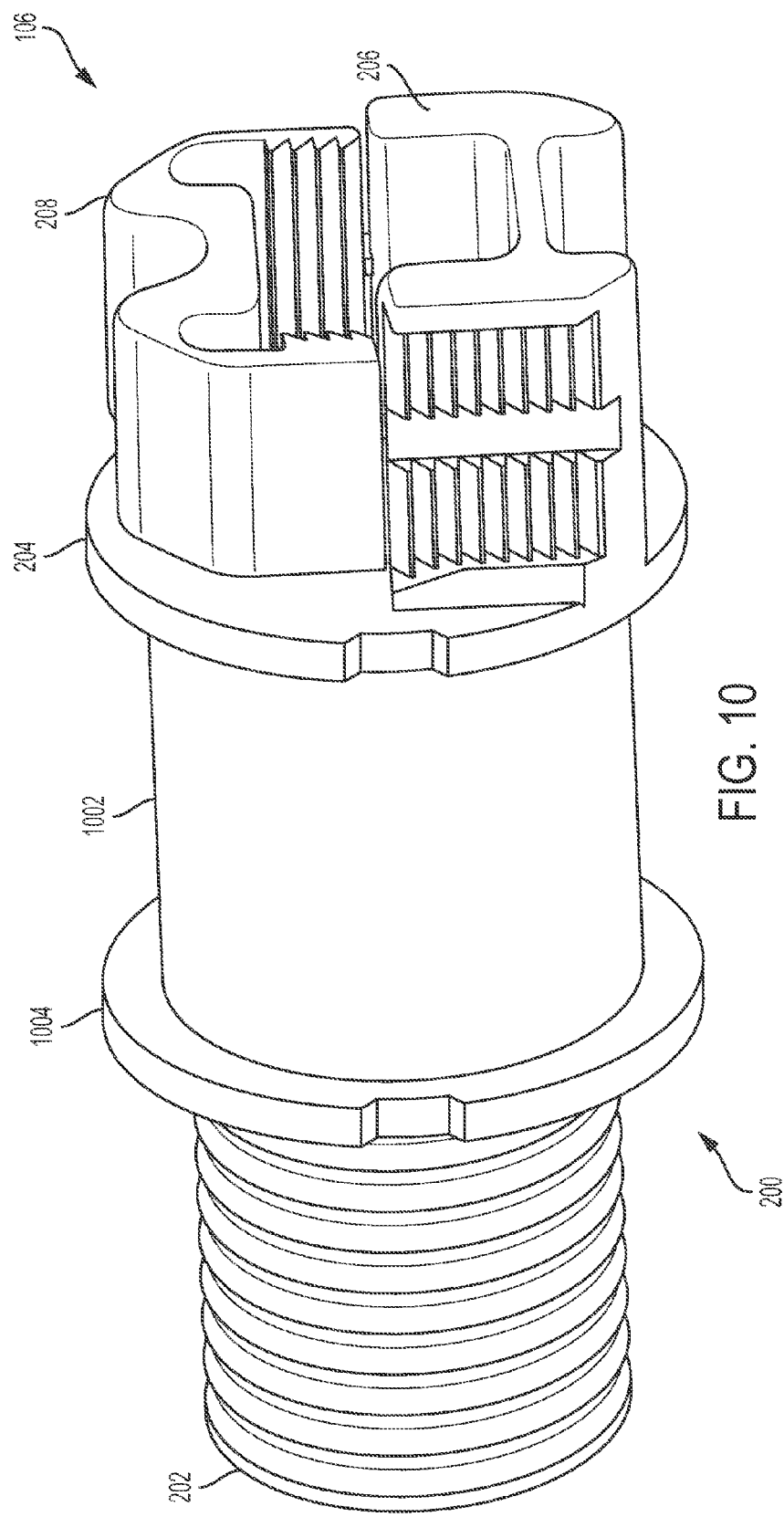
FIG. 10 is an axonometric projection of a bushing with an extended barrel, shown in the unclamped position according to one embodiment.

FIG. 10 is an axonometric projection of a bushing 106 with an extended barrel 1002 according to one embodiment. The bushing 106 can include an extended barrel 1002 positioned between the tail end 202 and the head end 206. The flange 204 can be positioned between the head end 206 and the extended barrel 1002. A second flange 1004 can be positioned between the extended barrel 1002 and the tail end 202.

In some embodiments, the extended barrel 1002 can be used to fix the bushing 106 in place.

Figure 11A:
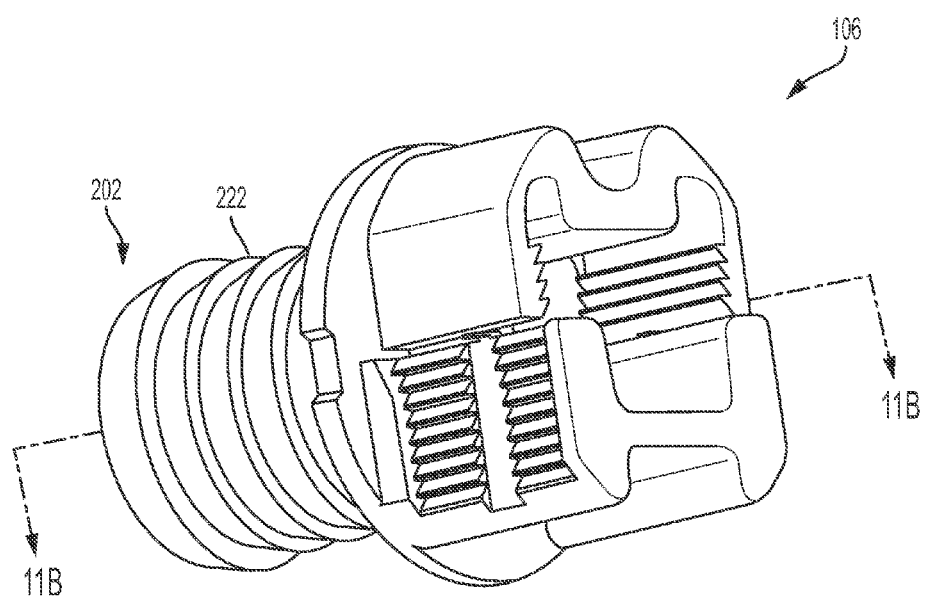
FIG. 11A is an axonometric projection of a bushing according to another embodiment, shown in the unclamped position.

FIG. 11A is an axonometric projection of a bushing 106 according to one embodiment. The tail end 202 of the bushing has ridges 222 that are sawtooth in shape. A sawtooth tread design can be easily assembled with a heat protection tube 104 or other component. The bushing 106 can be pushed into an end of the heat protection tube 104 and the heat protection tube 104 can be crimped or otherwise biased so the bushing 106 and the heat protection tube 104 are in mechanical contact.

Figure 11B:
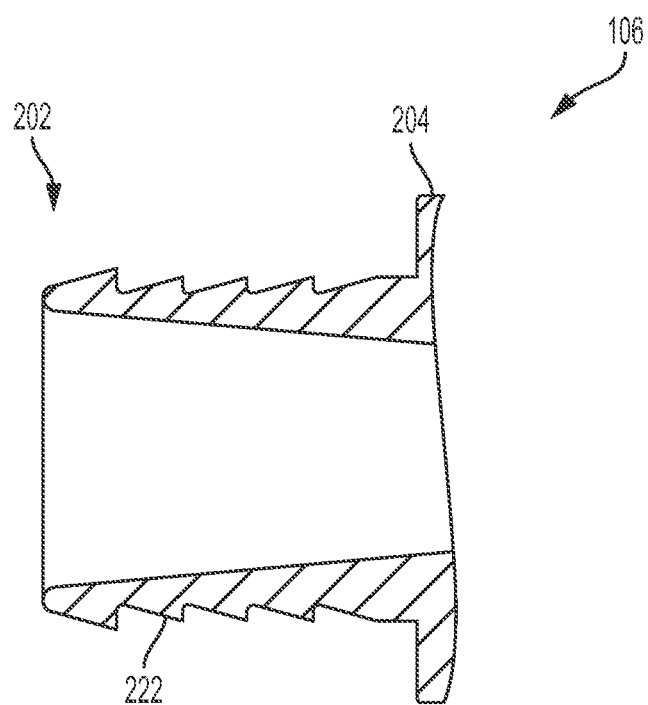
FIG. 11B is a partial cross-sectional view of the bushing of FIG. 11A taken along line 11B:11B.

FIG. 11B is a partial cross-sectional view of the bushing 106 of FIG. 11A taken along line 11B:11B. The tail end 202 is shown having ridges 222 that are sawtooth in shape.

Figure 11C:
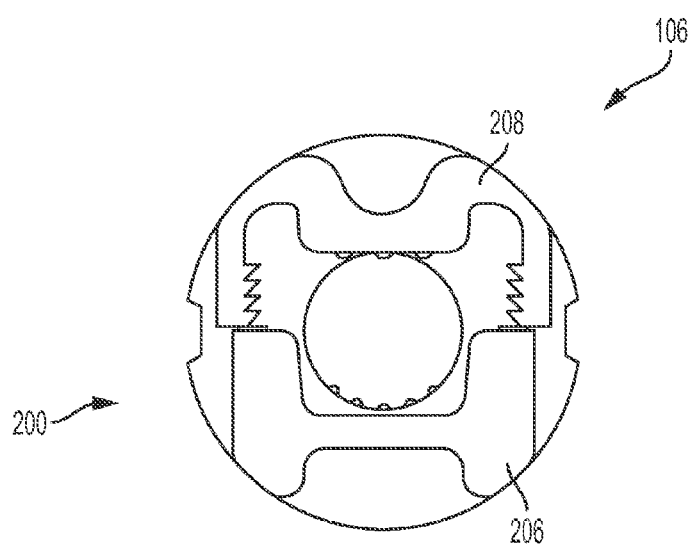
FIG. 11C is an end view of the bushing of FIG. 11A.

FIG. 11C is a front view of the bushing 106 of FIG. 11A.

Figure 12:
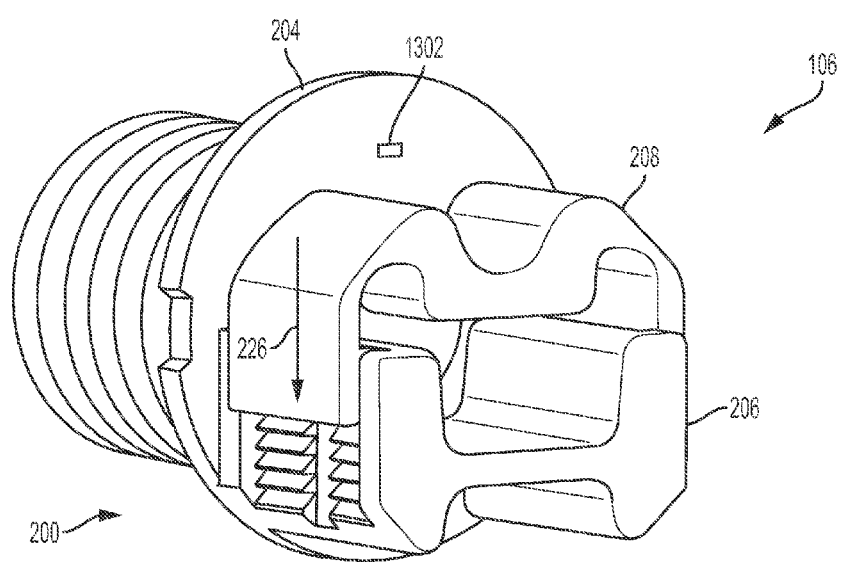
FIG. 12 is an axonometric projection of a bushing shown in a clamped position according to one embodiment.

FIG. 12 is an axonometric projection of a bushing 106 in a clamped position according to one embodiment. The two sets of teeth 212 on the clamp 208 are engaging the two sets of teeth 210 of the head end 206 to secure the clamp 208 against any movement in a direction opposite lateral direction 226. The clamp 208 can move further in the lateral direction 226 until it is limited from travel due to impacting the head end 206, or until it provides sufficient clamping pressure on any object positioned between the clamp 208 and the head end 206, such as a cable protection hose 108.

Additionally, a remnant of a breakable tab 1302 is shown on the flange 204, where the clamp 208 was previously attached to the main body 200 at the flange 204 via a breakable tab 214.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a bushing comprising a main body comprising a tail end and a head end; a clamp positioned adjacent the head end and fixed in an unclamped position by a breakable tab; and a locking mechanism for securing the clamp in a clamped position with respect to the head end.

Example 2 is a bushing of Example 1, wherein the locking mechanism comprises a first set of teeth on the clamp that engage a second set of teeth on the head end.

Example 3 is a bushing of Examples 1 or 2 wherein the bushing comprises a flange.

Example 4 is a bushing of Examples 1-3, wherein the bushing is an edge protection bushing.

Example 5 is a bushing of Examples 1-4, wherein the breakable tab is operable to break upon application of pressure upon the clamp in a lateral direction.

Example 6 is a bushing of Examples 1-5, wherein the breakable tab is operable to remain attached to the clamp upon breakage; and wherein the main body includes a groove into which the breakable tab can slide after breakage of the breakable tab.

Example 7 is a bushing of Example 6, wherein the groove is located adjacent a second set of teeth on the head end.

Example 8 is a bushing of Examples 1-7 wherein the bushing is an edge protection bushing, wherein the tail end is adapted to accept a heat protection tube, and wherein the head end is adapted to accept a cable protection hose.

Example 9 is a bushing of Example 8, wherein the heat protection tube is attached to a lambda sensor.

Example 10 is a method comprising positioning a hose between a head end of a bushing and a clamp attached to the bushing, wherein the clamp is maintained in an unclamped position by a breakable tab; and applying pressure to the clamp in a lateral direction to break the breakable tab, push the clamp onto the hose, and engage a locking mechanism that secures the clamp against the hose.

Example 11 is a method of Example 10, wherein engaging the locking mechanism comprises engaging a first set of teeth with a second set of teeth.

Example 12 is a method of Examples 10 or 11, wherein applying pressure to the clamp in the lateral direction includes positioning the clamp and the head end between a top block and a bottom block of a clamping tool; and applying pressure to the clamp through the clamping tool.

Example 13 is a method of Examples 10-12 further comprising breaking the breakable tab so that the breakable tab remains attached to the clamp upon breakage; and sliding the breakable tab along a groove to direct movement of the clamp.

Example 14 is a method of Examples 10-13 further comprising positioning a tube around a tail end of the bushing.

Example 15 is a method of Example 14, wherein positioning the tube further comprises positioning an end of the tube adjacent a flange of the bushing.

Example 16 is a method of Example 15, wherein the bushing is an edge protection bushing; wherein the hose is a cable protection hose; and wherein the tube is a heat protection tube.

Example 17 is a method of Example 16 further comprising attaching the heat protection tube to a lambda sensor.

Example 18 is an edge protection bushing comprising a main body comprising a groove, a tail end, a flange, and a head end, the flange separating the tail end from the head end; a clamp positioned adjacent the head end and fixed in an unclamped position by a breakable tab operable to break away upon application of pressure upon the clamp in a lateral direction; and a locking mechanism that secures the clamp in a clamped position, the locking mechanism comprising a first set of teeth on the clamp that engage with a second set of teeth on the head end; wherein the groove is shaped to slidably accept the breakable tab.

Example 19 is an edge protection bushing of Example 18, wherein the tail end is adapted to accept a heat protection tube; and the head end is adapted to accept a cable protection hose.

Example 20 is an edge protection bushing of Example 19, further comprising a first clamping recess on the clamp and a second clamping recess on the head end, the first clamping recess and the second clamping recess adapted to accept interlocking features of a clamping tool.

What is claimed is:

1. A bushing comprising:
   a main body comprising a tail end and a head end;
   a clamp positioned adjacent the head end;
   a locking mechanism;
   at least one breakable tab positioned adjacent to at least one of the main body or the clamp;
   an unclamped configuration; and
   a clamped configuration, wherein:
      the clamp is held in the unclamped configuration by the at least one breakable tab;
      the locking mechanism secures the clamp in the clamped configuration with respect to the head end;
      the bushing moves from the unclamped configuration to the clamped configuration only after the at least one breakable tab breaks due to pressure applied to at least one of the clamp or the main body;
      at least a portion of the at least one breakable tab is operable to remain attached to the clamp upon breakage; and
      the main body includes a groove such that the portion of the at least one breakable tab can slide into the groove after breakage such that the portion of the at least one breakable tab constrains movement of the clamp relative to the main body.

2. The bushing of claim 1, wherein the locking mechanism comprises a first plurality of teeth on the clamp that engage a second plurality of teeth on the head end when the bushing is in the clamped configuration.

3. The bushing of claim 1, wherein the at least one breakable tab breaks after the pressure is applied in a lateral direction.

4. The bushing of claim 1, wherein the groove is located adjacent a plurality of teeth on the head end and an axial direction of the groove extends in a direction that is approximately parallel to a direction in which the pressure is applied.

5. The bushing of claim 1, wherein:
   the bushing is an edge protection bushing;
   the tail end is adapted to accept a heat protection tube; and
   the head end is adapted to accept a cable protection hose.

6. The bushing of claim 1, wherein the at least one breakable tab comprises a rectangular protrusion.

7. The bushing of claim 2, wherein, in the unclamped configuration, the at least one breakable tab is located between (i) the first plurality of teeth on the clamp and (ii) the second plurality of teeth on the head end.

8. The bushing of claim 1, wherein the groove is disposed on an outer surface of the main body.

9. The bushing of claim 8, wherein the groove is disposed adjacent to the locking mechanism.

10. A method of using the bushing of claim 1, the method comprising:
    positioning a hose between the head end of the bushing and the clamp; and
    applying pressure to the clamp in a lateral direction to break the at least one breakable tab, push the clamp onto the hose, and engage the locking mechanism to secure the clamp against the hose.

11. The method of claim 10, wherein engaging the locking mechanism comprises engaging a first plurality of teeth with a second plurality of teeth.

12. The method of claim 10, wherein applying pressure to the clamp in the lateral direction includes:
    positioning the clamp and the head end between a top block and a bottom block of a clamping tool; and
    applying pressure to the clamp through the clamping tool.

13. The method of claim 10, further comprising:
    breaking the at least one breakable tab so that the at least one breakable tab remains attached to the clamp upon breakage; and
    sliding at least a portion of the at least one breakable tab along the groove to direct movement of the clamp.

14. The method of claim 10, further comprising:
    positioning a tube around a tail end of the bushing.

15. The method of claim 14, wherein positioning the tube further comprises positioning an end of the tube adjacent a flange of the bushing.

16. The method of claim 15, wherein:
    the bushing is an edge protection bushing;
    the hose is a cable protection hose; and
    the tube is a heat protection tube.

17. The method of claim 16, further comprising attaching the heat protection tube to a lambda sensor.

18. An edge protection bushing comprising:
    a main body comprising a groove, a tail end, a flange, and a head end, the flange separating the tail end from the head end;
    a clamp positioned adjacent the head end;
    a locking mechanism comprising a first plurality of teeth on the clamp that engage with a second plurality of teeth on the head end;
    at least one breakable tab positioned adjacent to at least one of the main body or the clamp;
    an unclamped configuration; and
    a clamped configuration, wherein:

the clamp is held in the unclamped configuration by the at least one breakable tab;

the locking mechanism secures the clamp in the clamped configuration;

the edge protection bushing moves from the unclamped configuration to the clamped configuration only after the at least one breakable tab breaks due to pressure applied to the clamp; and the groove is shaped to slidably accept at least a portion of the at least one breakable tab.

19. The edge protection bushing of claim 18, wherein:
the tail end is adapted to accept a heat protection tube; and
the head end is adapted to accept a cable protection hose.

20. The edge protection bushing of claim 19, further comprising a first clamping recess on the clamp and a second clamping recess on the head end, the first clamping recess and the second clamping recess adapted to accept interlocking features of a clamping tool.

21. The edge protection bushing of claim 18, wherein an axial direction of the groove extends approximately parallel to a direction in which the pressure is applied.

22. The edge protection bushing of claim 18, wherein the at least one breakable tab comprises a rectangular protrusion.

23. The edge protection bushing of claim 18, wherein the pressure applied to the clamp is applied in a lateral direction.

24. The edge protection bushing of claim 18, wherein the groove is disposed on an outer surface of the main body.

25. The edge protection bushing of claim 18, wherein the groove is disposed adjacent to the locking mechanism.

26. A bushing comprising:
a main body comprising a tail end and a head end;
a clamp positioned adjacent the head end;
a locking mechanism;
at least one breakable tab positioned adjacent to at least one of the main body or the clamp;
an unclamped configuration; and
a clamped configuration, wherein:
the clamp is held in the unclamped configuration by the at least one breakable tab;

the locking mechanism secures the clamp in the clamped configuration with respect to the head end;

the bushing moves from the unclamped configuration to the clamped configuration only after the at least one breakable tab breaks due to pressure applied to at least one of the clamp or the main body;

the locking mechanism comprises a first plurality of teeth on the clamp that engage a second plurality of teeth on the head end when the bushing is in the clamped configuration; and in the unclamped configuration, the at least one breakable tab is located between (i) the first plurality of teeth on the clamp and (ii) the second plurality of teeth on the head end.

* * * * *